US010104086B2

(12) United States Patent
Manjunath et al.

(10) Patent No.: US 10,104,086 B2
(45) Date of Patent: Oct. 16, 2018

(54) TECHNIQUES FOR FINE GRAINED PROTECTION OF RESOURCES IN AN ACCESS MANAGEMENT ENVIRONMENT

(71) Applicant: Oracle International Corporation, Redwood Shores, CA (US)

(72) Inventors: Srivatsa Manjunath, Fremont, CA (US); Yulong Cao, San Jose, CA (US); Premal Ramesh Desai, Burlington, MA (US); Juan Li, Needham, MA (US); Cai Wenliang, Beijing (CN); Ding Wenfang, Beijing (CN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 26 days.

(21) Appl. No.: 14/975,208

(22) Filed: Dec. 18, 2015

(65) Prior Publication Data

US 2016/0315943 A1 Oct. 27, 2016

Related U.S. Application Data

(60) Provisional application No. 62/152,677, filed on Apr. 24, 2015.

(51) Int. Cl.
*H04L 29/06* (2006.01)
(52) U.S. Cl.
CPC ............ *H04L 63/102* (2013.01); *H04L 63/20* (2013.01)
(58) Field of Classification Search
CPC .............................. H04L 63/102; H04L 63/20
See application file for complete search history.

(56) References Cited

U.S. PATENT DOCUMENTS 6,158,010 A 12/2000 Moriconi et al.
7,673,323 B1 3/2010 Moriconi
(Continued)

FOREIGN PATENT DOCUMENTS

CN 104462982 A 3/2015

OTHER PUBLICATIONS

U.S. Appl. No. 14/484,050, Non-Final Office Action dated Jan. 4, 2016, 14 pages.
(Continued)

*Primary Examiner* — Simon P Kanaan
(74) *Attorney, Agent, or Firm* — Kilpatrick Townsend & Stockton LLP

(57) ABSTRACT

In certain embodiments, techniques are provided (e.g., a method, a system, non-transitory computer-readable medium storing code or instructions executable by one or more processors) to provide fine grained protection of resources in an access management environment. An access management service can intercept requests for resources (e.g., content in a content management system) and provide fine-grained authorization service for content management systems, such as Microsoft Office Sharepoint Server. The access management service can provide external policy management, evaluation and enforcement for content management systems. The access management service can include a plurality of plugins associated with different types of resources available through the content management systems. Integrating an access management service with content management systems provides both user and administrator efficiencies while enforcing a consistent level of access security across an enterprise system.

20 Claims, 9 Drawing Sheets

(56) References Cited

U.S. PATENT DOCUMENTS

| | | |
|---|---|---|
| 9,471,798 B2 | 10/2016 | Vepa et al. |
| 2002/0059471 A1 | 5/2002 | Sanghvi et al. |
| 2002/0169974 A1 | 11/2002 | Mckune |
| 2002/0188568 A1 | 12/2002 | Nickolaisen et al. |
| 2003/0081621 A1 | 5/2003 | Godfrey et al. |
| 2003/0115322 A1 | 6/2003 | Moriconi et al. |
| 2004/0107360 A1 | 6/2004 | Herrmann et al. |
| 2005/0273600 A1 | 12/2005 | Seeman |
| 2006/0265758 A1 | 11/2006 | Khandelwal et al. |
| 2007/0143148 A1 | 6/2007 | Kol et al. |
| 2009/0325566 A1 | 12/2009 | Bell et al. |
| 2011/0131275 A1 | 6/2011 | Maida-Smith et al. |
| 2012/0036370 A1 | 2/2012 | Lim et al. |
| 2012/0131164 A1 | 5/2012 | Bryan et al. |
| 2012/0198041 A1 | 8/2012 | Black et al. |
| 2012/0260303 A1 | 10/2012 | Wollnik et al. |
| 2013/0086626 A1 | 4/2013 | Kavantzas et al. |
| 2013/0174216 A1 | 7/2013 | Simske et al. |
| 2013/0232540 A1 | 9/2013 | Saidi et al. |
| 2014/0032691 A1 | 1/2014 | Barton et al. |
| 2014/0109176 A1 | 4/2014 | Barton et al. |
| 2014/0173700 A1 | 6/2014 | Awan et al. |
| 2014/0189777 A1 | 7/2014 | Viswanathan et al. |
| 2015/0089575 A1 | 3/2015 | Vepa et al. |
| 2015/0172321 A1 | 6/2015 | Kirti et al. |
| 2016/0232374 A1 | 8/2016 | Huang et al. |
| 2016/0315926 A1 | 10/2016 | Agarwal et al. |
| 2016/0315965 A1 | 10/2016 | Sastry et al. |
| 2017/0004312 A1 | 1/2017 | Agarwal et al. |
| 2017/0004313 A1 | 1/2017 | Agarwal et al. |
| 2017/0006064 A1 | 1/2017 | Agarwal et al. |
| 2017/0019408 A1 | 1/2017 | Vepa et al. |
| 2017/0078721 A1 | 3/2017 | Brockmann et al. |
| 2017/0147825 A1 | 5/2017 | Barton et al. |

OTHER PUBLICATIONS

U.S. Appl. No. 14/484,050, Notice of Allowance dated Jun. 2, 2016, 8 pages.

U.S. Appl. No. 14/974,836, Non-Final Office Action dated Aug. 11, 2017, 15 pages.

U.S. Appl. No. 15/278,902, Non-Final Office Action dated Aug. 31, 2017, 19 pages.

U.S. Appl. No. 14/974,836, Final Office Action dated Dec. 27, 2017, 15 pages.

U.S. Appl. No. 15/197,463, Non-Final Office Action dated Feb. 9, 2018, 22 pages.

U.S. Appl. No. 15/197,478, Non-Final Office Action dated Feb. 7, 2018, 21 pages.

U.S. Appl. No. 14/974,836, Advisory Action dated Mar. 22, 2018, 3 pages.

U.S. Appl. No. 15/136,734, First Action Interview Pilot Program Pre-Interview Communication dated Mar. 5, 2018, 7 pages.

U.S. Appl. No. 15/136,734, First Action Interview Office Action Summary dated May 1, 2018, 7 pages.

U.S. Appl. No. 15/197,463, Applicant Initiated Interview Summary dated May 11, 2018, 3 pages.

U.S. Appl. No. 15/197,478, Applicant Initiated Interview Summary dated May 11, 2018, 3 pages.

U.S. Appl. No. 15/278,902, Final Office Action dated Apr. 20, 2018, 21 pages.

U.S. Appl. No. 15/197,472, First Action Interview Office Action Summary dated May 21, 2018, 4 pages.

TECHNIQUES FOR FINE GRAINED PROTECTION OF RESOURCES IN AN ACCESS MANAGEMENT ENVIRONMENT

CROSS-REFERENCES TO RELATED APPLICATIONS

This application is a non-provisional application and claims the benefit and priority of U.S. Provisional Application No. 62/152,677, filed on Apr. 24, 2015, entitled "TECHNIQUES FOR FINE GRAINED PROTECTION OF RESOURCES IN AN ACCESS MANAGEMENT ENVIRONMENT," which is herein incorporated by reference in its entirety for all purposes.

BACKGROUND

The present disclosure relates generally to computer systems and software, and more particularly to techniques for fine grained protection of resources in an access management environment.

Authorization services, such as Oracle Entitlements Server available from Oracle International Corporation, Redwood Shores, Calif., can provide various levels of access control and authorization to a variety of environments in an enterprise system. These authorization services typically enable applications, data stores, content management systems, and other systems or services to offload authorization and access management. This enables centralized access management rules and policies to be provided at the enterprise level.

However, not all enterprise systems can be fully integrated with authorization services. Additionally, different systems or services in an enterprise may provide different levels of security and access control. This may result in different portions of an enterprise system requiring different levels of security management to ensure proper security levels are maintained across the enterprise system. In addition to added costs of additional management and maintenance, this may also increase the risk of security vulnerabilities or breaches to the enterprise system.

SUMMARY

In certain embodiments, techniques are provided (e.g., a method, a system, non-transitory computer-readable medium storing code or instructions executable by one or more processors) to provide fine grained protection of resources in an access management environment. An access management service can intercept requests for resources (e.g., content in a content management system) and provide fine-grained authorization service for content management systems, such as Microsoft Office Sharepoint Server. The access management service can provide external policy management, evaluation and enforcement for content management systems. The access management service can include a plurality of plugins associated with different types of resources available through the content management systems. Integrating an access management service with content management systems provides both user and administrator efficiencies while enforcing a consistent level of access security across an enterprise system.

The techniques described above and below may be implemented in a number of ways and in a number of contexts. Several example implementations and contexts are provided with reference to the following figures, as described below in more detail. However, the following implementations and contexts are but a few of many.

DETAILED DESCRIPTION

In the following description, for the purposes of explanation, specific details are set forth in order to provide a thorough understanding of embodiments of the invention. However, it will be apparent that various embodiments may be practiced without these specific details. The figures and description are not intended to be restrictive.

In certain embodiments, techniques are provided (e.g., a method, a system, non-transitory computer-readable medium storing code or instructions executable by one or more processors) to provide fine grained protection of resources in an access management environment. An access management service can intercept requests for resources (e.g., content in a content management system) and provide fine-grained authorization service for content management systems, such as Microsoft Office Sharepoint Server. The access management service can provide external policy management, evaluation and enforcement for content management systems. The access management service can include a plurality of plugins associated with different types of resources available through the content management systems. Integrating an access management service with content management systems provides both user and administrator efficiencies while enforcing a consistent level of access security across an enterprise system.

Figure 1:
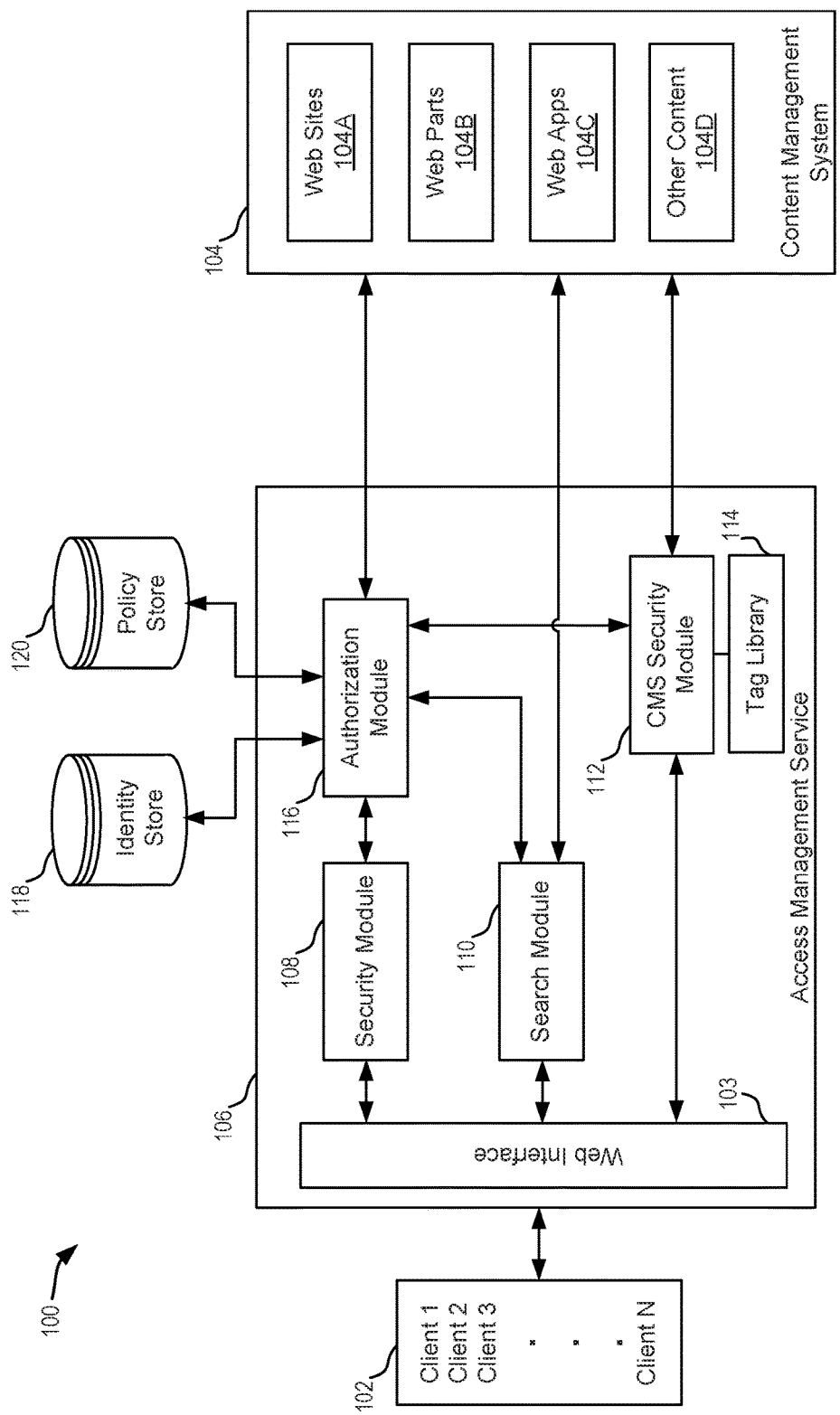
FIG. 1 illustrates an example of a system that provides fine grained protection of resources in an access management environment, in accordance with an embodiment of the present invention.

FIG. 1 illustrates an example of a system 100 that provides fine grained protection of resources in an access management environment, in accordance with an embodiment of the present invention. As shown in FIG. 1, system 100 may include one or more client devices (collectively, client devices 102) communicatively coupled to a content management system 104 and access management service via a communication network. The embodiment depicted in FIG. 1 is merely an example and is not intended to unduly limit the claimed embodiments of the present invention. One of ordinary skill in the art would recognize many variations, alternatives, and modifications. For example, there may be more or fewer client devices than those shown in FIG. 1.

The client devices may be of various different types, including, but not limited to personal computers, desktops, mobile or handheld devices such as a laptop, a mobile phone, a tablet, etc., and other types of devices. The communication network facilitates communications between client devices 102, content management system 104, and access management service 106. The communication network can be of various types and can include one or more communication networks. Examples of communication network 106 include, without restriction, the Internet, a wide area network (WAN), a local area network (LAN), an Ethernet network, a public or private network, a wired network, a wireless network, and the like, and combinations thereof. Different communication protocols may be used to facilitate the communications including both wired and wireless protocols such as IEEE 802.XX suite of protocols, TCP/IP, IPX, SAN, AppleTalk, Bluetooth, and other protocols. In general, communication network may include any communication network or infrastructure that facilitates communications between clients 102, content management system 104, and access management service 106.

In some embodiments, access management service 106 can intercept resource requests from clients 102 sent to content management system 104. Resource requests can include requests for any resources available through content management system 104, including web sites 104A, web parts 104B, web apps 104C, and other content 104D. Access management service 106 can include various plugins 108, 110, 112, 114, associated with different types of resources available from content management system 104. When a resource request is received, e.g., through web interface 103, the type of resource requested can be determined and a plugin corresponding to that type of resource can be invoked. For example, a request for a web site 104A or other URL or URI referenced resource may be processed by security module 108. Security module 108 can send the request to authorization module 116 to determine whether the requestor (e.g., user, process, etc.) may access the requested resource. In some embodiments, a requested resource can include multiple resources. For example, a web page (e.g., a resource) can include multiple components (e.g., web parts, doc list, etc.). When a user requests the web page and it is served from the content management system 104, content management system 104 can invoke CMS security module 112 to authorize the user for each resource. In some embodiments, a tag library 114 can be provided which allows portions of a resource to be tagged such that those tagged portions are subject to different authorization requirements. When the resource is served, CMS security module 112 can parse the resource, identify any tagged portions of the resource, and send a request to authorization module 116 to determine if the requestor is authorized to access those portions. In some embodiments, a request for a resource may include a query to be used to search the content management system. The query may result in a list of resources which may include resources the requestor cannot access. When a search request is received, search module 110 can query content management system 104 which may return a list of resources responsive to the query. Search module 110 may then request authorization of each resource in the results for the requestor. Based on the authorization results returned by authorization module 116, the search results may be trimmed (e.g., those resources which the requestor cannot access are removed) and the trimmed search results can be returned to the requestor.

In some embodiments, authorization services provided by access management service 106 for content management service 104 may be selectively enabled or disabled for different types of resources by enabling or disabling plugins 108, 110, 112, 114.

In some embodiments, authorization module 116 can identify the requestor (e.g., using identity information included with the request and identity store 118) and apply security policies (e.g., stored in policy store 120) to the request. The policies can include fine grained conditions (e.g., time of day, location, domain-specific policies like subscription level, business hierarchy access, etc.) for access to resources which may be applied to a plurality of different content management systems in communication with access management service 106. This enables access management service 106 to provide centralized and consistent access control across the various systems of an enterprise.

In some embodiments, policy store 120 can include a list of protected resources in the content management system 104. Policies to be applied by access management service 106 may then be written for the protected resources. In some embodiments, an import utility may interface with the content management system 104 to import the list of protected resources into policy store 120. Similarly, a list of users and their access permissions may also be obtained from content management system 104 and stored in identity store 118. In some embodiments, the user information can be synchronized with other enterprise identity management systems accessible to the access management service 106.

In some embodiments, permission levels provided in access management service 106 can mirror those provided natively by content management system 104, and extend those native permission levels with fine grained access policies. For example, a content management service may natively support four permission levels, where each permission level has specific permissions associated with it. Permissions may be categorized as site permissions, list permissions, and personal permissions, depending upon the objects to which they can be applied. The following table shows one such example. The following is provided for example purposes only, alternative permission levels and models may also be used.

TABLE 1

Example Permission Levels

| Permission | Meaning |
|---|---|
| Read | View Items |
| | Open Items |
| | View Versions |
| | Create Alerts |
| | Use Self-Service Site Creation |
| | View Pages |
| Contribute | Read permissions, plus: |
| | Add Items |

TABLE 1-continued

Example Permission Levels

| Permission | Meaning |
| --- | --- |
| | Edit Items |
| | Delete Items |
| | Delete Versions |
| | Browse Directories |
| | Edit Personal User Information |
| | Manage Personal Views |
| | Add/Remove Personal Web Parts |
| | Update Personal Web Parts |
| Design | Contribute permissions, plus: |
| | Add and Customize Pages |
| | Apply Themes and Borders |
| | Apply Style Sheets |
| FullControl | All permissions |

In some embodiments, policies may be written to include many different conditions, to provide flexibility in various enterprise systems. Any number or combination of policy models (e.g., role based access control, application based access control, enterprise RBAC, etc.) may be used. Access management service 106 can maintain a resource model of resources for which access management services are provided. Policies that include fine grained conditional statements (e.g., related to identity, time, location, and other variables) enable roles to be assigned dynamically when an access request is received. Thus, a user who may access a given resource during business hours, may be denied access after business hours, according to the policy associated with the user and/or with the resource. The authorization module can dynamically retrieve policies associated with the requestor and/or with the requested resource, evaluate the policy or policies dynamically at request-time, and grant or deny access to the requested resource based on the evaluation.

Figure 2:
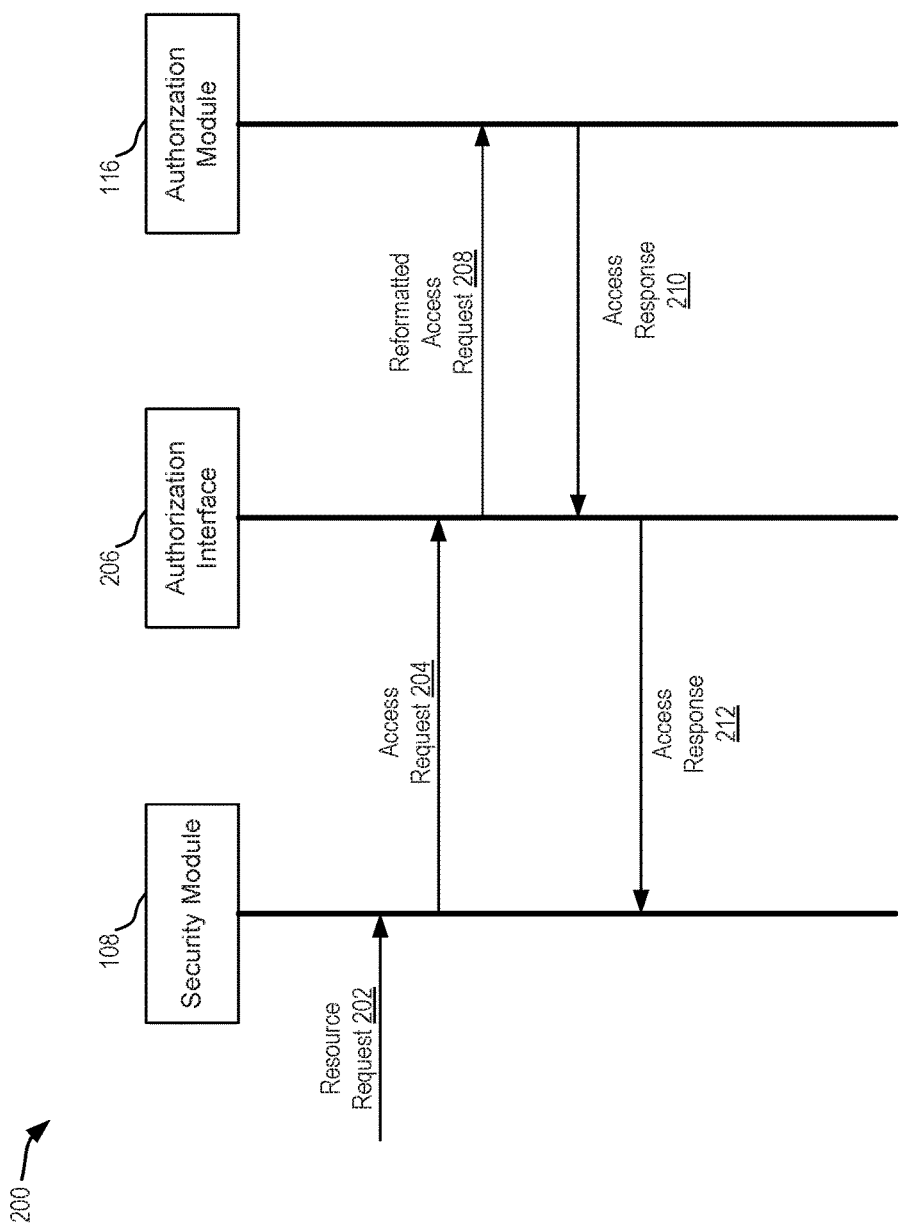
FIG. 2 depicts an example of a sequence diagram that illustrates fine grained protection of web sites in an access management environment, in accordance with an embodiment of the present invention.

FIG. 2 depicts an example of a sequence diagram 200 that illustrates fine grained protection of web sites in an access management environment, in accordance with an embodiment of the present invention. As shown in FIG. 2, a requestor (e.g., any of clients 102) sends a request 202 for a resource stored in a content management system, it can be intercepted by security module 108. In some embodiments, the request can trigger one or more events that are processed by event handlers. Security module 108 can be registered with one of the event handlers, such that a request for a URL referenced resource (e.g., web sites or web pages) is redirected to security module 108. Security module can then send an access request 204 to authorization module 116. In some embodiments, access request 204 can be sent to authorization module 116 via an authorization interface 206, which may reformat or otherwise modify the access request before sending the modified access request to authorization module 116.

In some embodiments, URL referenced resources can be organized in a resource hierarchy. Policies can be created on these resources for groups and/or users that determine whether the group and/or user has access to view the resources. Authorization module 116 may determine whether the requestor can access the requested resource by applying one or more policies associated with the resource and/or associated with the requestor to the request 208. The authorization module may then return an access response 210 (e.g., authorized/not authorized or other boolean value) to the security module 108. In some embodiments, access response message 210 can be returned to authorization interface 206 which may return access response message 212 to security module 108. The security module 108 can then enforce the access decision. If the requestor is denied access, the requestor can be redirected to an error page with a message indicating that the requestor is not authorized to access the resource.

Figure 3:
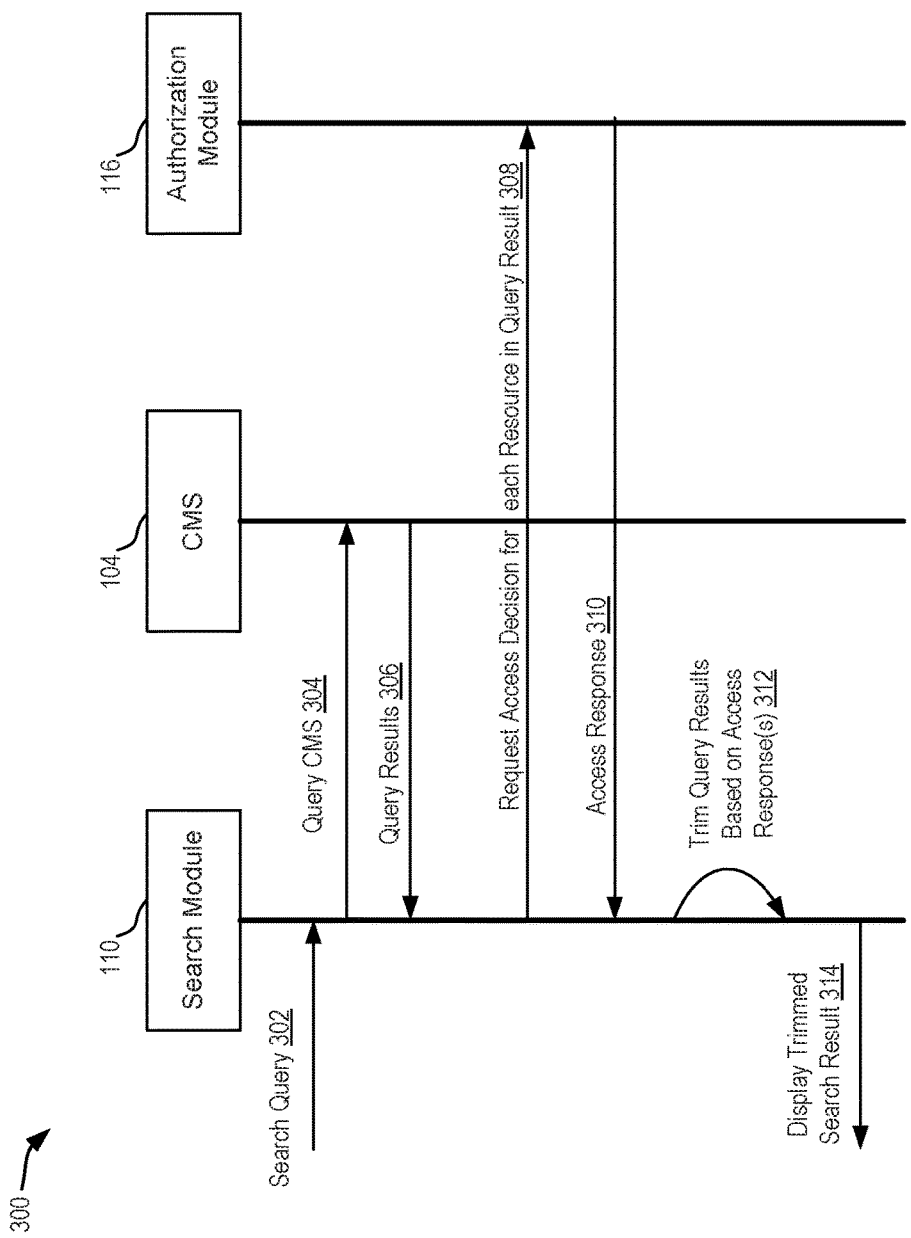
FIG. 3 depicts an example of a sequence diagram that illustrates fine grained protection of search results in an access management environment, in accordance with an embodiment of the present invention.

FIG. 3 depicts an example of a sequence diagram 300 that illustrates fine grained protection of search results in an access management environment, in accordance with an embodiment of the present invention. As shown in FIG. 3, content management systems can include search functionality, enabling users to submit queries and receive a list of resources responsive to the query stored in the content management system. However, the requestor may not be authorized to view all of the resources responsive to the query. As such, embodiments of the present invention include a search module 110 which can intercept search results and restrict requestors to view search results based on externally defined access management service authorization policies. In some embodiments, the search module 110 can filter search results such that requestors are restricted to view only authorized content based on user attributes as well as document attributes such as document type, category and managed properties.

As shown in FIG. 3, when a search query 302 is received it can be intercepted by search module 110. In some embodiments, search module 110 can be protected by security module 108. Search module 110 can then query 304 content management system 104. In some embodiments, content management system 104 can expose a search interface through which search module 110 can submit query 304. Content management system 104 can return query results 306 which may include a list of resources responsive to the query. In some embodiments, the list of resources can include a list of URLs, URIs, or other identifiers for resources responsive to the query. Search module 110 can then request an access decision 308 for each resource in query results 306 from authorization module 116. In some embodiments, a batch access request can be sent to authorization module 116, whereas in some embodiments search module 110 may iterate through the query results list and send individual access requests for each resource listed therein. Authorization module 116 may then return access response 310, which includes a boolean value (or values, in the case of a batch request) indicating whether access is allowed for each resource in the query results. In some embodiments, a data structure representing an array of boolean values, one for each resource in the query results, can be returned.

At step 312, the search module can trim the results based on the identity of the requestor submitting the query and the access response received from authorization module 116. For example, the search module 110 can use the boolean values included in the access response 310 to trim the search results: if the value is true, the corresponding resource is included in the returned results; if false, the corresponding resource is removed. At step 314, the trimmed search result is returned to the requestor.

Figure 4:
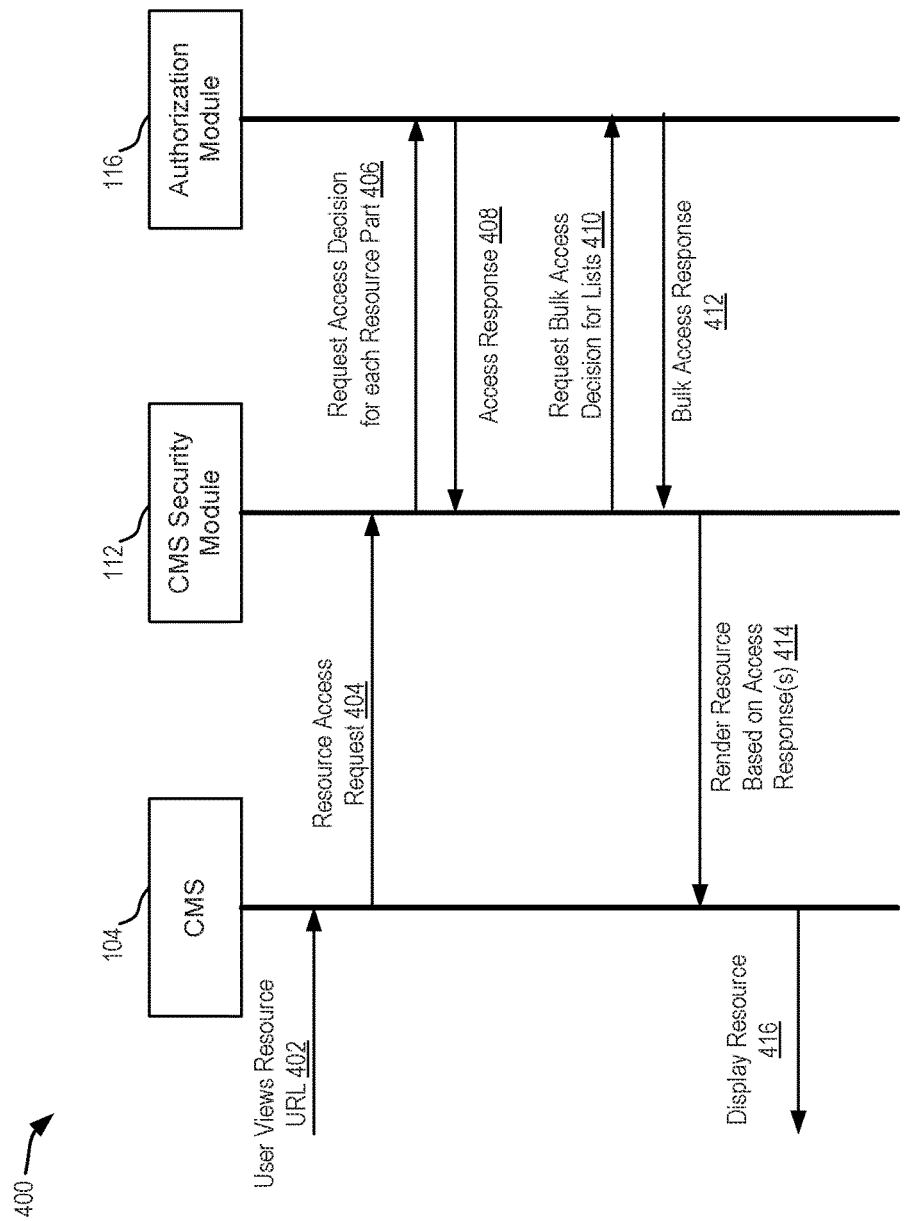
FIG. 4 depicts an example of a sequence diagram that illustrates fine grained protection of web parts in an access management environment, in accordance with an embodiment of the present invention.

FIG. 4 depicts an example of a sequence diagram 400 that illustrates fine grained protection of web parts in an access management environment, in accordance with an embodiment of the present invention. As shown in FIG. 4, a resource can include multiple resources (also referred to herein as resource parts or components). For example, a web page may include various web parts which may each display content within the web page. In some embodiments, resource parts may be represented in the access management service using the resource part's display name as a resource identifier. A requestor may have access to a web page, but may not have access to each web part included within that web page. In some embodiments, the resource parts may represent a collection of items within a web part on a web page (e.g., a list). Each list item can identified by a URL and represented in the access management service resource model. As such, after a user has been granted access to a resource (e.g., as described above with respect to FIG. 2) the request 402 to access the resource is sent to content management system 104 and further access management may be provided to resource parts included in that resource.

Content management system 104 can send a resource access request 404 to CMS security module 112. CMS security module 112 can be a content management system-specific module to which the content management system 104 delegates access management decisions. By integrating CMS security module 112 into access management service 106, centralized and consistent access management services may be provided across an enterprise. In some embodiments, resource access request 404 can include requestor identification information (e.g., user name or other identifier) and a resource identifier (e.g., URL). CMS security module 112 can request an access decision 406 for each resource part included in the requested resource from authorization module 116. Authorization module can return an access decision 408 including a boolean value indicating whether the requestor can access the resource part.

As shown in FIG. 4, bulk (e.g., batch) access requests 410 can be sent to authorization module 116 for some resource parts (e.g., lists). A data structure can be returned indicating for each resource in the bulk access request 410 a boolean value representing the access decision. CMS security module 112 can then render each resource part based on the access decision. For example, each resource part associated with a value of 'true' can be rendered, while each resource part associated with a value of 'false' can be blocked.

Figure 5:
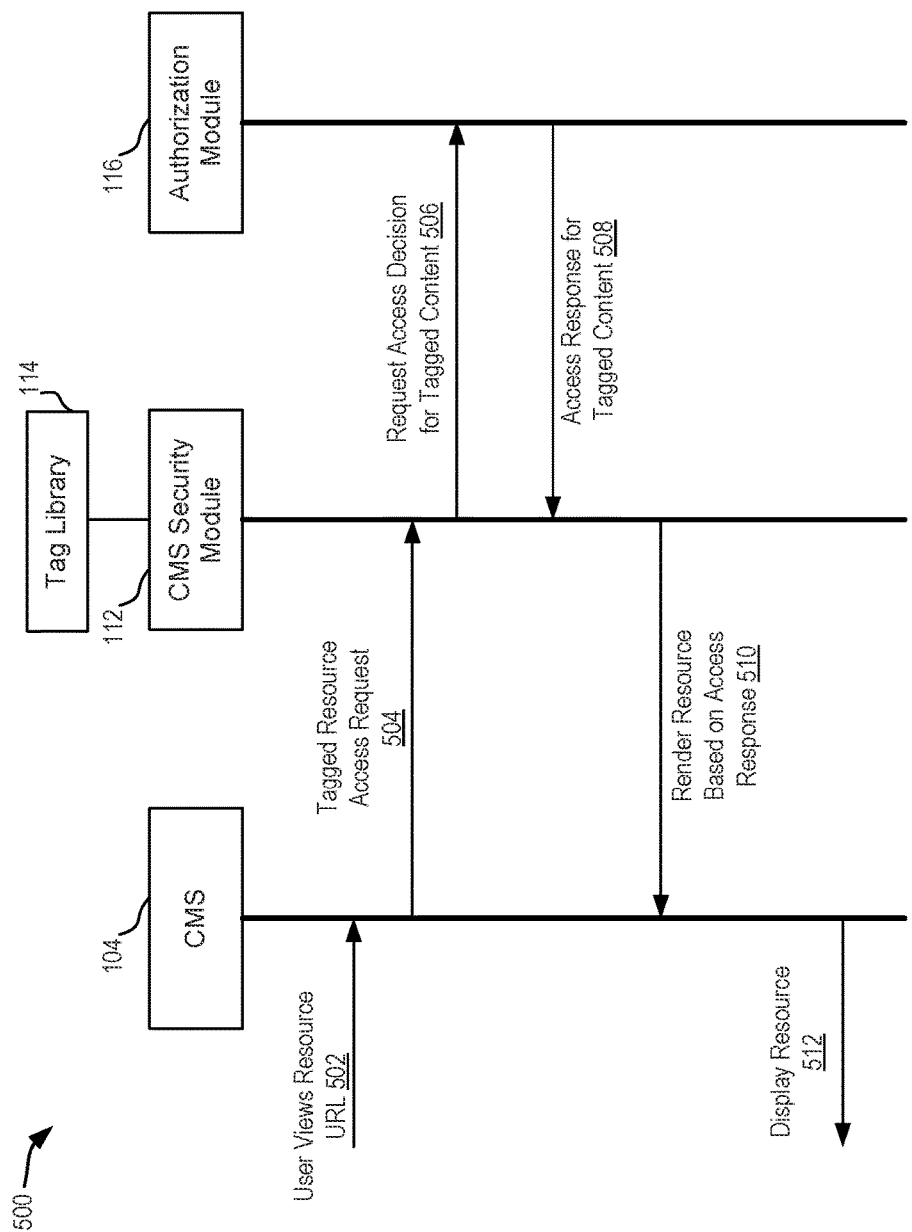
FIG. 5 depicts an example of a sequence diagram that illustrates fine grained protection of custom content in an access management environment, in accordance with an embodiment of the present invention.

FIG. 5 depicts an example of a sequence diagram 500 that illustrates fine grained protection of custom content in an access management environment, in accordance with an embodiment of the present invention. In some embodiments, content management systems can enable custom resources (e.g., web pages) to be generated. Custom resources may include sensitive information that needs access control. The protection of custom resources can be managed using tag library 114, which allows the content developer to enclose portions of the custom resource using custom tags that indicate varying levels of access. In some embodiments, the custom tag library 114 can be a server side web control with which the content developer may register the custom resource. When the custom resource is rendered, the tag library 114 is invoked and access management is provided based on the tags used in the custom resource.

As shown in FIG. 5, after a user has been granted access to a resource (e.g., as described above with respect to FIG. 2) the request 502 to access the resource is sent to content management system 104 and further access management. Content management system 104 can send a resource access request 504 to CMS security module 112. CMS security module 112 can be a content management system-specific module to which the content management system 104 delegates access management decisions. By integrating CMS security module 112 into access management service 106, centralized and consistent access management services may be provided across an enterprise. CMS security module 112 can communicate with tag library 114. In some embodiments, resource access request 504 can include requestor identification information (e.g., user name or other identifier) and a resource identifier (e.g., URL). CMS security module 112 can identify tags within the requested resource and parse the tags using tag library 114. CMS security module can request an access decision 506 for each tag included in the requested resource from authorization module 116. Authorization module can return an access decision 508 including a boolean value indicating whether the requestor can access the tagged content. CMS security module 112 can then render the requested content, including any tagged portions, based on the access decision. For example, each tagged portion associated with a value of 'true' can be rendered, while each tagged portion associated with a value of 'false' can be blocked.

Figure 6:
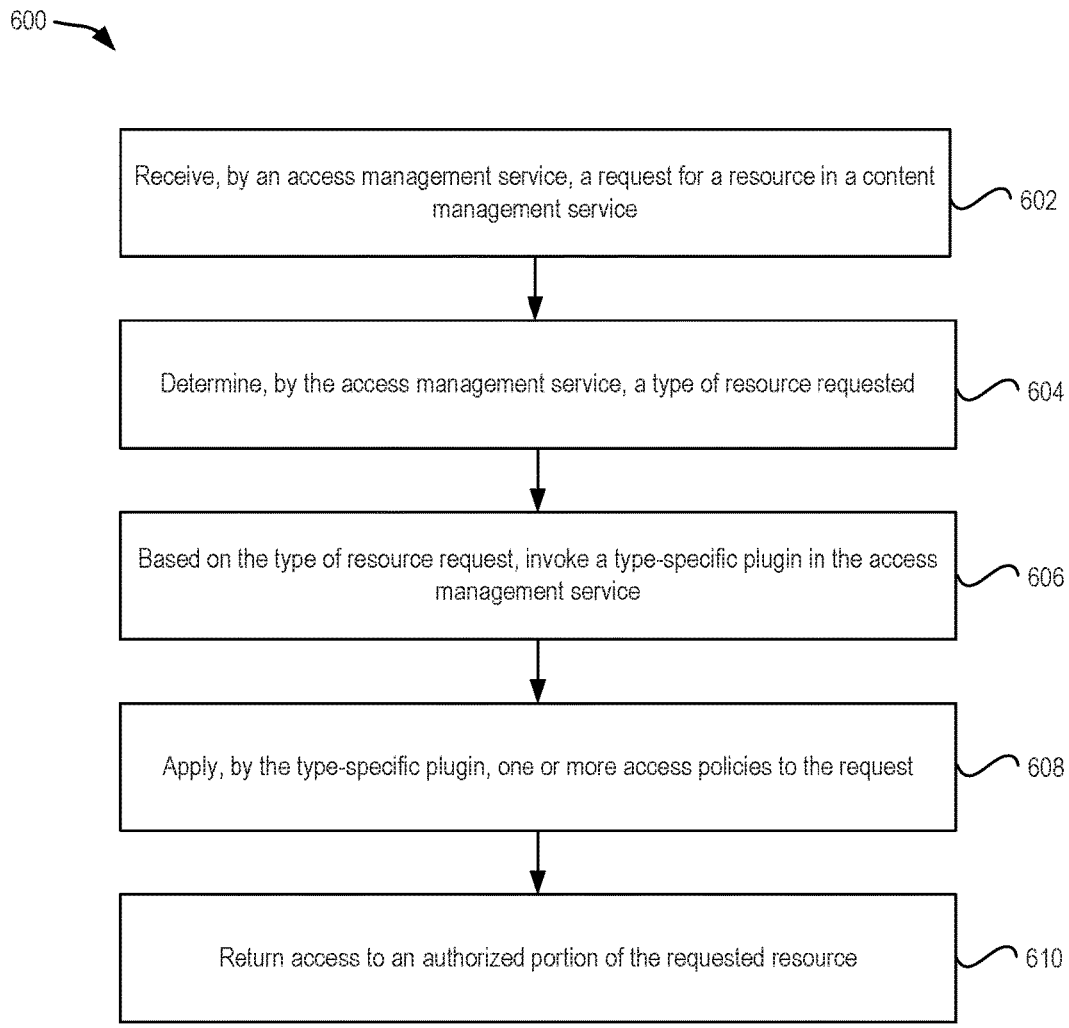
FIG. 6 illustrates an example of a method of providing fine grained protection of resources in an access management environment, in accordance with an embodiment of the present invention.

FIG. 6 illustrates an example of a method 600 of providing fine grained protection of resources in an access management environment, in accordance with an embodiment of the present invention. At block 602 an access management service can receive a request for a resource in a content management system. In some embodiments, the request can be intercepted between a user and the content management system. In some embodiments, the request can be sent from the content management system to the access management service in response to an access request received from a user.

At block 604, the access management service can determine a type of resource requested. In some embodiments, the type of resource requested can include a web page (or other URL referenced resource), a search, a resource part (e.g., a web part, list, or other component of a resource), or a tagged portion of a resource. At block 606, based on the type of resource requested, the access management service can invoke a type-specific plugin in the access management service. In some embodiments, the type-specific plugin can include a security module, a search module, a content management service-specific plugin, and/or a custom tag library.

At block 606, the type-specific plugin can apply one or more access policies to the request. In some embodiments, the one or more access policies include content management service access policies imported by the access management service from the content management service. In some embodiments, the one or more access policies include access management service fine grained access policies.

In some embodiments, when the type of resource requested is a web site (or other URL referenced resource) the type-specific plugin invoked can be a security module which is configured to determine identity information associated with a requester, send an access request including the request for the resource and the identity information to an authorization module, receive an access response from the authorization module, and provide access based on the access response.

In some embodiments, when the type of resource requested is a search the type-specific plugin invoked is the search module which is configured to determine identity information associated with a requester, send a search query included with the request for the resource to the content management service, receive a query result from the content management service, send an access request to an authorization module for each resource in the search query, receive an access decision for each resource in the search query, trim the query results based on the access decision, and return the trimmed query results.

In some embodiments, when the type of resource requested is web page content the type-specific plugin invoked is the custom tag library which is configured to determine identity information associated with a requester, send an access request including a tag associated with the requested resource and the identity information to an authorization module, receive an access response from the authorization module, and render the requested resource based on the access response.

In some embodiments, when the type of resource requested is a web part the type-specific plugin invoked is the content management service-specific plugin which is configured to determine identity information associated with a requester, send an access request including the request for the resource and the identity information to an authorization module, receive an access response from the authorization module, and render the requested resource based on the access response.

At block 610, access to an authorized portion of the requested resource can be returned. In some embodiments, where access to a resource is denied, a redirect can be returned causing an error screen to be rendered.

Figure 7:
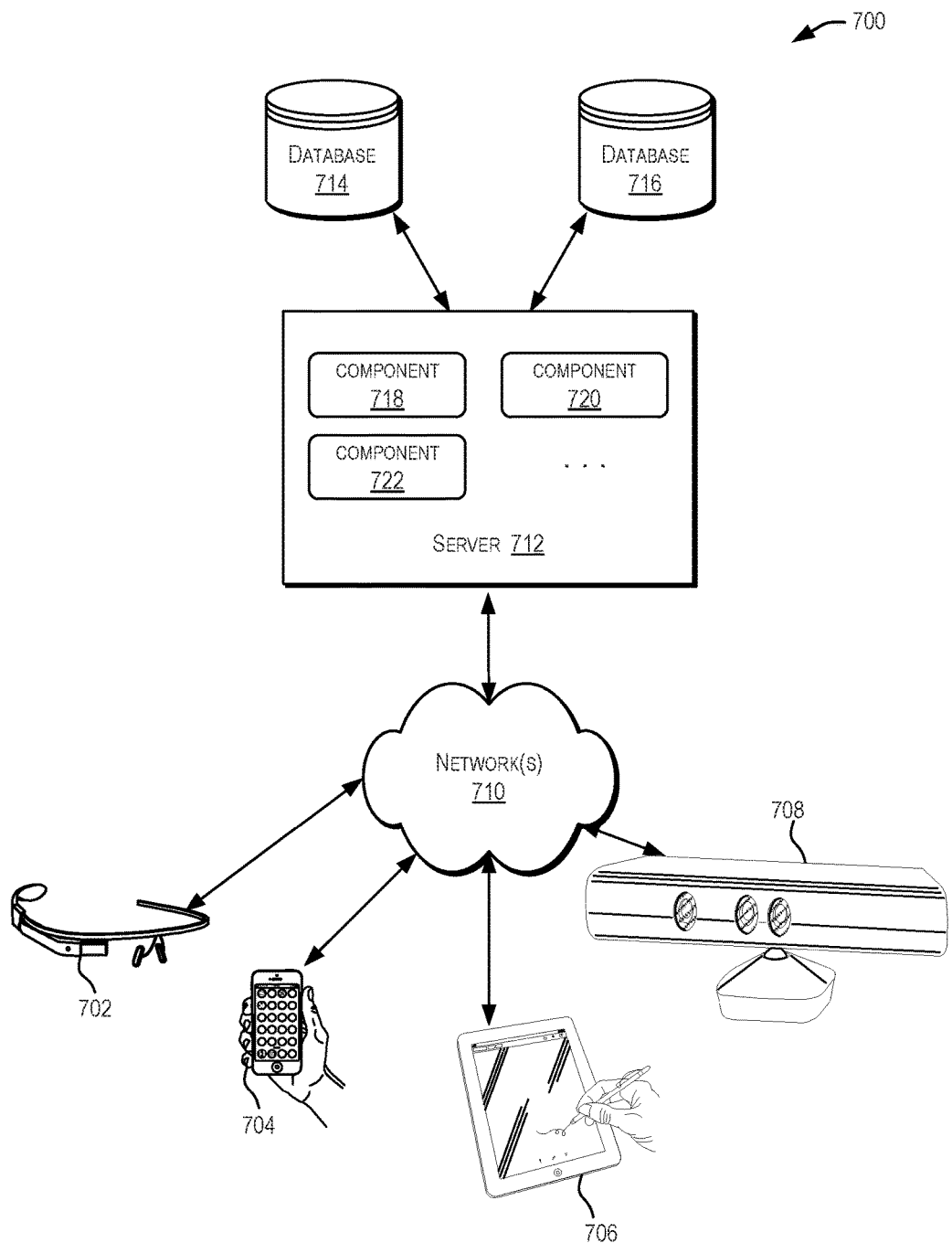
FIG. 7 depicts a simplified diagram of a distributed system for implementing an embodiment of the present invention.

FIG. 7 depicts a simplified diagram of a distributed system 700 for implementing an embodiment of the present disclosure. In the illustrated embodiment, the distributed system 700 includes one or more client computing devices 702, 704, 706, and 708, which are configured to execute and operate a client application such as a web browser, proprietary client (e.g., Oracle Forms), or the like over one or more network(s) 710. The server 712 may be communicatively coupled with the remote client computing devices 702, 704, 706, and 708 via network 710.

In various embodiments, the server 712 may be adapted to run one or more services or software applications such as services and applications that provide storage management services and identity management services. In certain embodiments, the server 712 may also provide other services or software applications can include non-virtual and virtual environments. In some embodiments, these services may be offered as web-based or cloud services or under a Software as a Service (SaaS) model to the users of the client computing devices 702, 704, 706, and/or 708. Users operating the client computing devices 702, 704, 706, and/or 708 may in turn utilize one or more client applications to interact with the server 712 to utilize the services provided by these components.

In the configuration depicted in FIG. 7, the software components 718, 720 and 722 of system 700 are shown as being implemented on the server 712. In other embodiments, one or more of the components of the system 700 and/or the services provided by these components may also be implemented by one or more of the client computing devices 702, 704, 706, and/or 708. Users operating the client computing devices may then utilize one or more client applications to use the services provided by these components. These components may be implemented in hardware, firmware, software, or combinations thereof. It should be appreciated that various different system configurations are possible, which may be different from distributed system 700. The embodiment shown in FIG. 10 is thus one example of a distributed system for implementing an embodiment system and is not intended to be limiting.

The client computing devices 702, 704, 706, and/or 708 may include various types of computing systems. For example, client device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over the network(s) 710.

Although distributed system 700 in FIG. 7 is shown with four client computing devices, any number of client computing devices may be supported. Other devices, such as devices with sensors, etc., may interact with the server 712.

The network(s) 710 in the distributed system 700 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, the network(s) 710 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

The server 712 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. The server 712 can include one or more virtual machines running virtual operating systems, or other computing architectures involving virtualization. One or more flexible pools of logical storage devices can be virtualized to maintain virtual storage devices for the server. Virtual networks can be controlled by the server 712 using software defined networking. In various embodiments, the server 712 may be adapted to run one or more services or software applications described in the foregoing disclosure. For example, the server 712 may correspond to a server for performing processing as described above according to an embodiment of the present disclosure.

The server 712 may run an operating system including any of those discussed above, as well as any commercially available server operating system. Server 712 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, the server 712 may include one or more applications to analyze and consolidate data feeds and/or event updates received from users of the client computing devices 702, 704, 706, and 708. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. The server 712 may also include one or more applications to display the data feeds and/or real-time events via one or more display devices of the client computing devices 702, 704, 706, and 708.

The distributed system 700 may also include one or more databases 714 and 716. These databases may provide a mechanism for storing information such as user identity information, and other information used by embodiments of the present invention. Databases 714 and 716 may reside in a variety of locations. By way of example, one or more of databases 714 and 716 may reside on a non-transitory storage medium local to (and/or resident in) the server 712. Alternatively, the databases 714 and 716 may be remote from the server 712 and in communication with the server 712 via a network-based or dedicated connection. In one set of embodiments, the databases 714 and 716 may reside in a storage-area network (SAN). Similarly, any necessary files for performing the functions attributed to the server 712 may be stored locally on the server 712 and/or remotely, as appropriate. In one set of embodiments, the databases 714 and 716 may include relational databases, such as databases provided by Oracle, that are adapted to store, update, and retrieve data in response to SQL-formatted commands.

Figure 8:
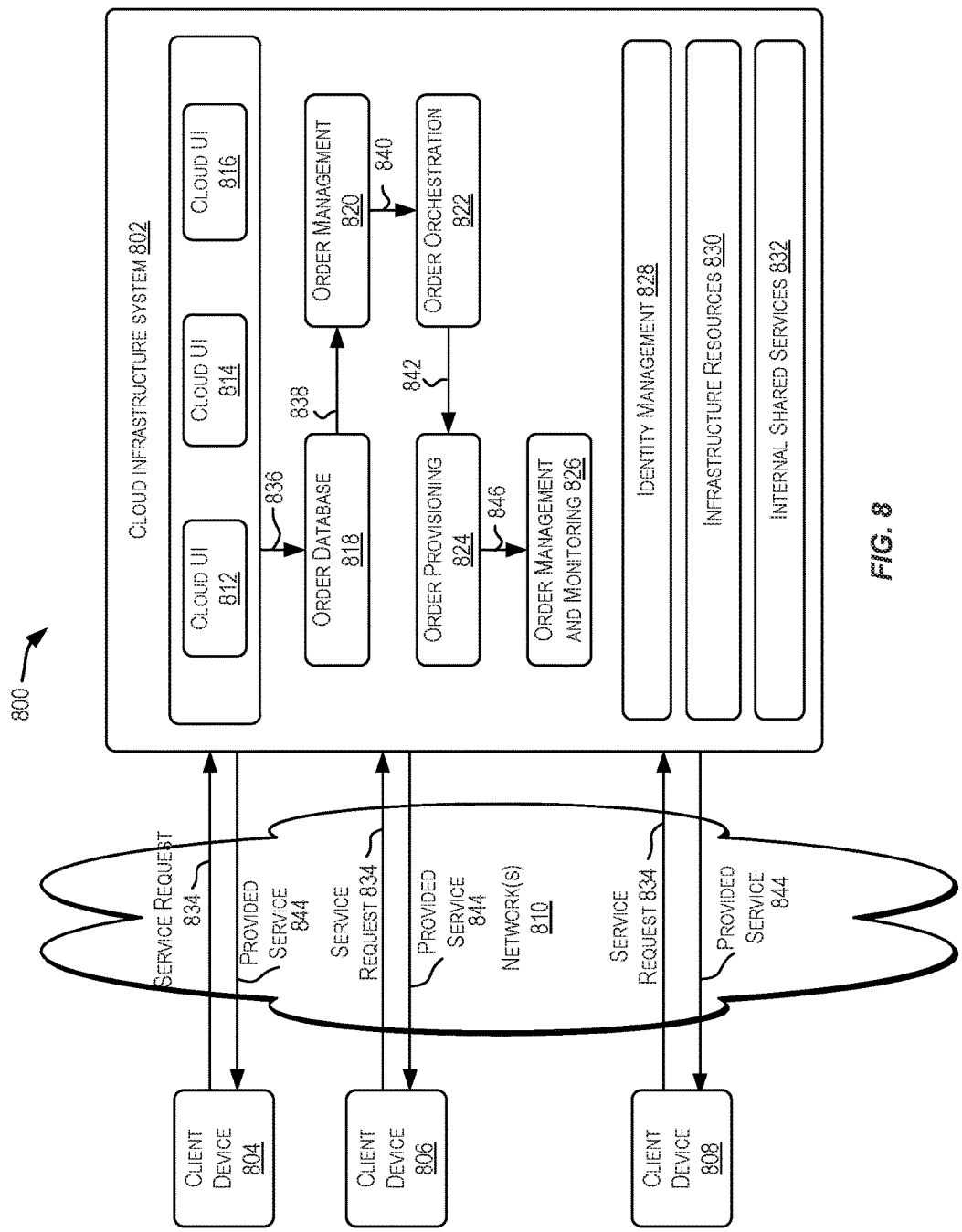
FIG. 8 is a simplified block diagram of one or more components of a system environment in which services may be offered as cloud services, in accordance with an embodiment of the present invention.

In some embodiments, the storage services and identity management services described above may be offered as services via a cloud environment. FIG. 8 is a simplified block diagram of one or more components of a system environment 800 in which services may be offered as cloud services, in accordance with an embodiment of the present disclosure. In the illustrated embodiment in FIG. 8, system environment 800 includes one or more client computing devices 804, 806, and 808 that may be used by users to interact with a cloud infrastructure system 802 that provides cloud services, including services for managing the storage of data stored in a data storage system of an organization. Cloud infrastructure system 802 may comprise one or more computers and/or servers that may include those described above for server 712.

It should be appreciated that cloud infrastructure system 802 depicted in FIG. 8 may have other components than those depicted. Further, the embodiment shown in FIG. 8 is only one example of a cloud infrastructure system that may incorporate an embodiment of the invention. In some other embodiments, cloud infrastructure system 802 may have more or fewer components than shown in the figure, may combine two or more components, or may have a different configuration or arrangement of components.

Client computing devices 804, 806, and 808 may be devices similar to those described above for 702, 704, 706, and 708. Client computing devices 804, 806, and 808 may be configured to operate a client application such as a web browser, a proprietary client application (e.g., Oracle® Forms), or some other application, which may be used by a user of the client computing device to interact with cloud infrastructure system 802 to use services provided by cloud infrastructure system 802. Although exemplary system environment 800 is shown with three client computing devices, any number of client computing devices may be supported. Other devices such as devices with sensors, etc. may interact with cloud infrastructure system 802.

Network(s) 810 may facilitate communications and exchange of data between clients 804, 806, and 808 and cloud infrastructure system 802. Each network may be any type of network familiar to those skilled in the art that can support data communications using any of a variety of commercially-available protocols, including those described above for network(s) 710.

In certain embodiments, services provided by cloud infrastructure system 802 may include a host of services that are made available to users of the cloud infrastructure system on demand. In addition to services related to identity management, various other services may also be offered including without limitation online data storage and backup solutions, Web-based e-mail services, hosted office suites and document collaboration services, database processing, managed technical support services, and the like. Services provided by cloud infrastructure system can dynamically scale to meet the needs of its users.

In certain embodiments, a specific instantiation of a service provided by cloud infrastructure system 802 may be referred to herein as a "service instance." In general, any service made available to a user via a communication network, such as the Internet, from a cloud service provider's system is referred to as a "cloud service." Typically, in a public cloud environment, servers and systems that make up the cloud service providers system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 802 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Cloud infrastructure system 802 may also provide "big data" related computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 802 may be adapted to automatically provision, manage and track a customer's subscription to services offered by cloud infrastructure system 802. Cloud infrastructure system 802 may provide the cloud services via different deployment models. For example, services may be provided under a public cloud model in which cloud infrastructure system 802 is owned by an organization selling cloud services (e.g., owned by Oracle Corporation) and the services are made available to the general public or different industry enterprises. As another example, services may be provided under a private cloud model in which cloud infrastructure system 802 is operated solely for a single organization and may provide services for one or more entities within the organization. The cloud services may also be provided under a community cloud model in which cloud infrastructure system 802 and the services provided by cloud infrastructure system 802 are shared by several organizations in a related community. The cloud services may also be provided under a hybrid cloud model, which is a combination of two or more different models.

In some embodiments, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 802. Cloud infrastructure system 802 then performs processing to provide the services in the customer's subscription order.

In some embodiments, the services provided by cloud infrastructure system 802 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 802 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 802 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 802 may also include infrastructure resources 830 for providing the resources used to provide various services to customers of the cloud infrastructure system. In one embodiment, infrastructure resources 830 may include pre-integrated and optimized combinations of hardware, such as servers, storage, and networking resources to execute the services provided by the PaaS platform and the SaaS platform, and other resources.

In some embodiments, resources in cloud infrastructure system 802 may be shared by multiple users and dynamically re-allocated per demand. Additionally, resources may be allocated to users in different time zones. For example, cloud infrastructure system 802 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 832 may be provided that are shared by different components or modules of cloud infrastructure system 802 to enable provision of services by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 802 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 802, and the like.

In one embodiment, as depicted in FIG. 8, cloud management functionality may be provided by one or more modules, such as an order management module 820, an order orchestration module 822, an order provisioning module 824, an order management and monitoring module 826, and an identity management module 828. These modules may include or be provided using one or more computers and/or servers, which may be general purpose computers, specialized server computers, server farms, server clusters, or any other appropriate arrangement and/or combination.

In an exemplary operation, at 834, a customer using a client device, such as client device 804, 806 or 808, may interact with cloud infrastructure system 802 by requesting one or more services provided by cloud infrastructure system 802 and placing an order for a subscription for one or more services offered by cloud infrastructure system 802. In certain embodiments, the customer may access a cloud User Interface (UI) such as cloud UI 812, cloud UI 814 and/or cloud UI 816 and place a subscription order via these UIs. The order information received by cloud infrastructure system 802 in response to the customer placing an order may include information identifying the customer and one or more services offered by the cloud infrastructure system 802 that the customer intends to subscribe to.

At 836, the order information received from the customer may be stored in an order database 818. If this is a new order, a new record may be created for the order. In one embodiment, order database 818 can be one of several databases operated by cloud infrastructure system 818 and operated in conjunction with other system elements.

At 838, the order information may be forwarded to an order management module 820 that may be configured to perform billing and accounting functions related to the order, such as verifying the order, and upon verification, booking the order.

At 840, information regarding the order may be communicated to an order orchestration module 822 that is configured to orchestrate the provisioning of services and resources for the order placed by the customer. In some instances, order orchestration module 822 may use the services of order provisioning module 824 for the provisioning. In certain embodiments, order orchestration module 822 enables the management of business processes associated with each order and applies business logic to determine whether an order should proceed to provisioning.

As shown in the embodiment depicted in FIG. 8, at 842, upon receiving an order for a new subscription, order orchestration module 822 sends a request to order provisioning module 824 to allocate resources and configure resources needed to fulfill the subscription order. Order provisioning module 824 enables the allocation of resources for the services ordered by the customer. Order provisioning module 824 provides a level of abstraction between the cloud services provided by cloud infrastructure system 800 and the physical implementation layer that is used to provision the resources for providing the requested services. This enables order orchestration module 824 to be isolated from implementation details, such as whether or not services and resources are actually provisioned on the fly or pre-provisioned and only allocated/assigned upon request.

At 844, once the services and resources are provisioned, a notification may be sent to the subscribing customers indicating that the requested service is now ready for use. In some instance, information (e.g. a link) may be sent to the customer that enables the customer to start using the requested services.

At 846, a customer's subscription order may be managed and tracked by an order management and monitoring module 826. In some instances, order management and monitoring module 826 may be configured to collect usage statistics regarding a customer use of subscribed services. For example, statistics may be collected for the amount of storage used, the amount data transferred, the number of users, and the amount of system up time and system down time, and the like.

In certain embodiments, cloud infrastructure system 800 may include an identity management module 828 that is configured to provide identity services, such as access management and authorization services in cloud infrastructure system 800. In some embodiments, identity management module 828 may control information about customers who wish to utilize the services provided by cloud infrastructure system 802. Such information can include information that authenticates the identities of such customers and information that describes which actions those customers are authorized to perform relative to various system resources (e.g., files, directories, applications, communication ports, memory segments, etc.) Identity management module 828 may also include the management of descriptive information about each customer and about how and by whom that descriptive information can be accessed and modified.

Figure 9:
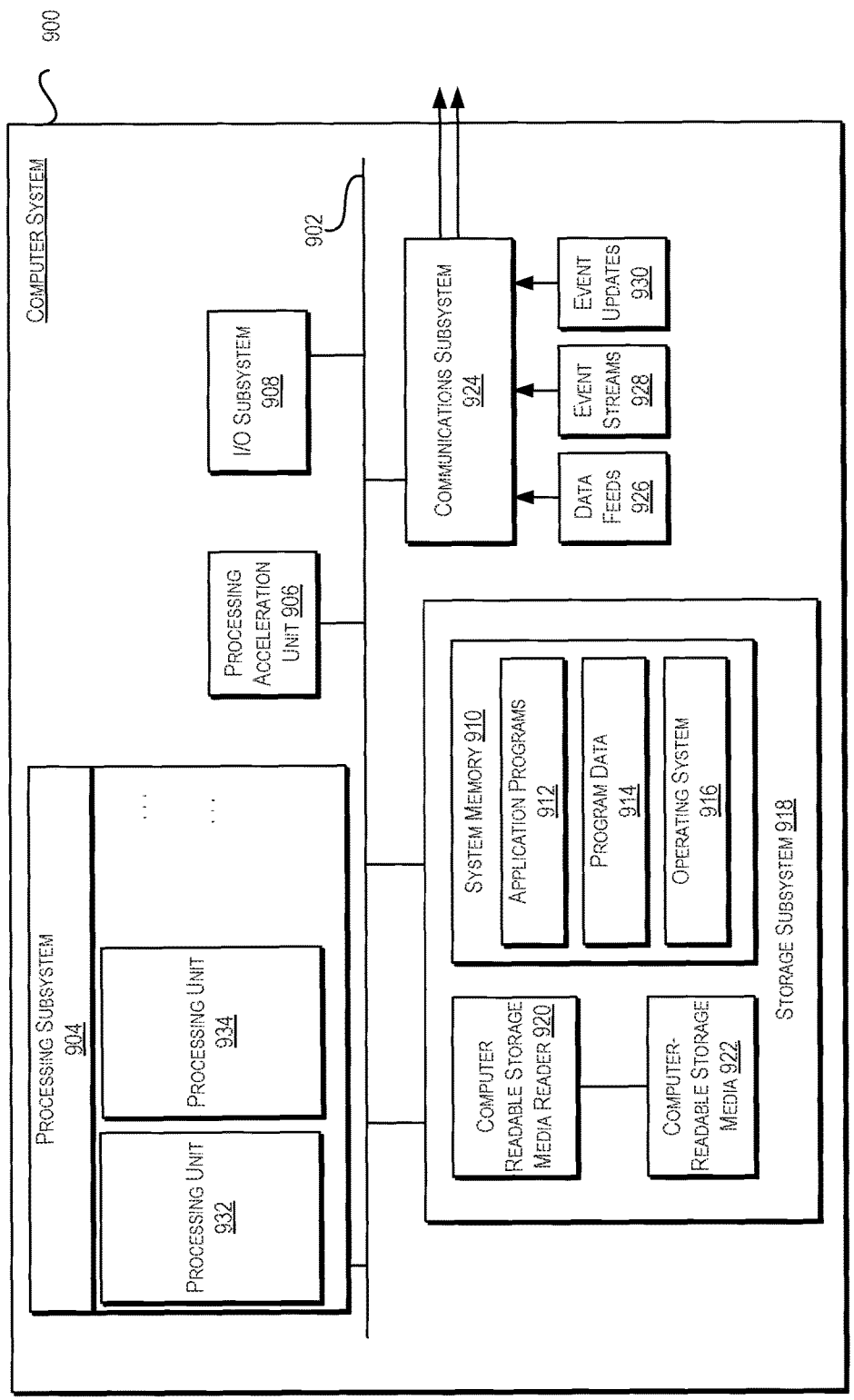
FIG. 9 illustrates an exemplary computer system that may be used to implement an embodiment of the present invention.

FIG. 9 illustrates an exemplary computer system 900 that may be used to implement an embodiment of the present invention. In some embodiments, computer system 900 may be used to implement any of the various servers and computer systems described above. As shown in FIG. 9, computer system 900 includes various subsystems including a processing subsystem 904 that communicates with a number of peripheral subsystems via a bus subsystem 902. These peripheral subsystems may include a processing acceleration unit 906, an I/O subsystem 908, a storage subsystem 918 and a communications subsystem 924. Storage subsystem 918 may include tangible computer-readable storage media 922 and a system memory 910.

Bus subsystem 902 provides a mechanism for letting the various components and subsystems of computer system 900 communicate with each other as intended. Although bus subsystem 902 is shown schematically as a single bus, alternative embodiments of the bus subsystem may utilize multiple buses. Bus subsystem 902 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 904 controls the operation of computer system 900 and may comprise one or more processing units 932, 934, etc. A processing unit may include be one or more processors, including single core or multicore processors, one or more cores of processors, or combinations thereof. In some embodiments, processing subsystem 904 can include one or more special purpose co-processors such as graphics processors, digital signal processors (DSPs), or the like. In some embodiments, some or all of the processing units of processing subsystem 904 can be implemented using customized circuits, such as application specific integrated circuits (ASICs), or field programmable gate arrays (FPGAs).

In some embodiments, the processing units in processing subsystem 904 can execute instructions stored in system memory 910 or on computer readable storage media 922. In various embodiments, the processing units can execute a variety of programs or code instructions and can maintain multiple concurrently executing programs or processes. At any given time, some or all of the program code to be executed can be resident in system memory 910 and/or on computer-readable storage media 910 including potentially on one or more storage devices. Through suitable programming, processing subsystem 904 can provide various functionalities described above for dynamically modifying documents (e.g., webpages) responsive to usage patterns.

In certain embodiments, a processing acceleration unit 906 may be provided for performing customized processing or for off-loading some of the processing performed by processing subsystem 904 so as to accelerate the overall processing performed by computer system 900.

I/O subsystem 908 may include devices and mechanisms for inputting information to computer system 900 and/or for outputting information from or via computer system 900. In general, use of the term "input device" is intended to include all possible types of devices and mechanisms for inputting information to computer system 900. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 900 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 918 provides a repository or data store for storing information that is used by computer system 900. Storage subsystem 918 provides a tangible non-transitory computer-readable storage medium for storing the basic programming and data constructs that provide the functionality of some embodiments. Software (programs, code modules, instructions) that when executed by processing subsystem 904 provide the functionality described above may be stored in storage subsystem 918. The software may be executed by one or more processing units of processing subsystem 904. Storage subsystem 918 may also provide a repository for storing data used in accordance with the present invention.

Storage subsystem 918 may include one or more non-transitory memory devices, including volatile and non-volatile memory devices. As shown in FIG. 9, storage subsystem 918 includes a system memory 910 and a computer-readable storage media 922. System memory 910 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 900, such as during start-up, may typically be stored in the ROM. The RAM typically contains data and/or program modules that are presently being operated and executed by processing subsystem 904. In some implementations, system memory 910 may include multiple different types of memory, such as static random access memory (SRAM) or dynamic random access memory (DRAM).

By way of example, and not limitation, as depicted in FIG. 9, system memory 910 may store application programs 912, which may include client applications, Web browsers, mid-tier applications, relational database management systems (RDBMS), etc., program data 914, and an operating system 916. By way of example, operating system 916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 922 may store programming and data constructs that provide the functionality of some embodiments. Software (programs, code modules, instructions) that when executed by processing subsystem 904 a processor provide the functionality described above may be stored in storage subsystem 918. By way of example, computer-readable storage media 922 may include non-volatile memory such as a hard disk drive, a magnetic disk drive, an optical disk drive such as a CD ROM, DVD, a Blu-Ray® disk, or other optical media. Computer-readable storage media 922 may include, but is not limited to, Zip® drives, flash memory cards, universal serial bus (USB) flash drives, secure digital (SD) cards, DVD disks, digital video tape, and the like. Computer-readable storage media 922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 922 may provide storage of computer-readable instructions, data structures, program modules, and other data for computer system 900.

In certain embodiments, storage subsystem 900 may also include a computer-readable storage media reader 920 that can further be connected to computer-readable storage media 922. Together and, optionally, in combination with system memory 910, computer-readable storage media 922 may comprehensively represent remote, local, fixed, and/or removable storage devices plus storage media for storing computer-readable information.

In certain embodiments, compute system 900 may provide support for executing one or more virtual machines. Computer system 900 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 900. Accordingly, multiple operating systems may potentially be run concurrently by computer system 900. Each virtual machine generally runs independently of the other virtual machines.

Communications subsystem 924 provides an interface to other computer systems and networks. Communications subsystem 924 serves as an interface for receiving data from and transmitting data to other systems from computer system 900. For example, communications subsystem 924 may enable computer system 900 to establish a communication channel to one or more client devices via the Internet for receiving and sending information from and to the client devices. For example, access management server 106 depicted in FIG. 1 may intercept resource requests from client devices using communication subsystem 924.

Communication subsystem 924 may support both wired and/or wireless communication protocols. For example, in certain embodiments, communications subsystem 924 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 924 can provide wired network connectivity (e.g., Ethernet) in addition to or instead of a wireless interface.

Communication subsystem 924 can receive and transmit data in various forms. For example, in some embodiments, communications subsystem 924 may receive input communication in the form of structured and/or unstructured data feeds 926, event streams 928, event updates 930, and the like. For example, communications subsystem 924 may be configured to receive (or send) data feeds 926 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 924 may be configured to receive data in the form of continuous data streams, which may include event streams 928 of real-time events and/or event updates 930, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 924 may also be configured to output the structured and/or unstructured data feeds 926, event streams 928, event updates 930, and the like to one or more databases that may be in communication with one or more streaming data source computers coupled to computer system 900.

Computer system 900 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 900 depicted in FIG. 9 is intended only as a specific example. Many other configurations having more or fewer components than the system depicted in FIG. 9 are possible. Based on the disclosure and teachings provided herein, a person of ordinary skill in the art will appreciate other ways and/or methods to implement the various embodiments.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps. Various features and aspects of the above-described embodiments may be used individually or jointly.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific invention embodiments have been described, these are not intended to be limiting. Various modifications and equivalents are within the scope of the following claims.

What is claimed is:

1. A computer-implemented method for providing fine-grained access protection of resources, the method comprising:
   receiving, by an access management service, a request from a requester for a resource in a content management system, wherein the resource comprises a plurality of resource parts;
   determining, by the access management service, a type of the resource;
   invoking, by the access management service, a resource type-specific plugin based on the type of the resource in the request;
   for each resource part of the plurality of resource parts, determining, by the type-specific plugin, whether the requester is authorized to access the resource part based on one or more access policies;
   providing access to the requester, by the access management service, to the resource parts the requester is authorized to access; and
   blocking access to the requester, by the access management service, to the resource parts the requester is not authorized to access.

2. The computer-implemented method of claim 1, wherein the type-specific plugin includes one of a search module, a content management service-specific plugin, and a custom tag library.

3. The computer-implemented method of claim 1, wherein the one or more access policies comprise access policies that limit access to the requester based on one or more of time of day, location, subscription level, and business hierarchy.

4. The computer-implemented method of claim 2, wherein the type of the resource is a search and the type-specific plugin invoked is the search module, wherein the search module is configured to:
   determine identity information associated with the requester;
   send a search query included with the request for the resource to the content management system;
   receive a query result from the content management system;
   send an access request to an authorization module for each resource in the query result; and
   receive an access decision for each resource in the query result.

5. The computer-implemented method of claim 2, wherein the type of the resource is web page content comprising a plurality of web parts, and wherein the type-specific plugin invoked is the custom tag library, wherein the custom tag library is configured to:
   determine identity information associated with the requester;
   identify, for each web part of the plurality of web parts, an associated tag;
   send an access request, for each web part, including the associated tag and the identity information to an authorization module; and
   receive an access response from the authorization module for each web part.

6. The computer-implemented method of claim 2, wherein the type of the resource is a web page comprising a plurality of web parts, and wherein the type-specific plugin invoked is the content management service-specific plugin, wherein the content management service-specific plugin is configured to:
   determine identity information associated with the requester;
   send an access request, for each web part, including the request for the web part and the identity information to an authorization module; and
   receive an access response from the authorization module for each web part.

7. The computer-implemented method of claim 1, wherein the one or more access policies include content management service access policies imported by the access management service from the content management system.

8. A system for providing fine-grained access protection of resources, the system comprising:
   an access management service, including a plurality of resource type-specific plugins; and
   a content management service, including a plurality of resources;
   wherein a request for a resource comprising a plurality of resource parts in a content management system is received from a requester, the access management service is configured to:
   intercept the request for the resource in the content management system;
   determine a type of the resource;
   invoke one of the resource type-specific plugins based on the type of the resource in the request;
   for each resource part of the plurality of resource parts, determine, by the type-specific plugin, whether the requester is authorized to access the resource part based on one or more access policies;
   provide access to the requester to the resource parts the requester is authorized to access; and
   block access to the requester to the resource parts the requester is not authorized to access.

9. The system of claim 8, wherein the type-specific plugin includes one of a search module, a content management service-specific plugin, and a custom tag library.

10. The system of claim 8, wherein the one or more access policies comprise access policies that limit access to the requester based on one or more of time of day, location, subscription level, and business hierarchy.

11. The system of claim 9, wherein the type of the resource is a search and the type-specific plugin invoked is the search module, wherein the search module is configured to:
    determine identity information associated with the requester;
    send a search query included with the request for the resource to the content management service;
    receive a query result from the content management service;
    send an access request to an authorization module for each resource in the query result; and
    receive an access decision for each resource in the query result.

12. The system of claim 9, wherein the type of the resource is web page content comprising a plurality of web parts, and wherein the type-specific plugin invoked is the custom tag library, wherein the custom tag library is configured to:
- determine identity information associated with the requester;
- identify, for each web part of the plurality of web parts, an associated tag;
- send an access request, for each web part, including the associated tag and the identity information to an authorization module; and
- receive an access response from the authorization module for each web part.

13. The system of claim 9, wherein the type of the resource is a web page comprising a plurality of web parts, and wherein the type-specific plugin invoked is the content management service-specific plugin, wherein the content management service-specific plugin is configured to:
- determine identity information associated with the requester;
- send an access request, for each web part, including the request for the web part and the identity information to an authorization module; and
- receive an access response from the authorization module for each web part.

14. The system of claim 8, wherein the one or more access policies include content management service access policies imported by the access management service from the content management service.

15. A non-transitory computer readable storage medium including instructions stored thereon which, when executed by a processor, cause the processor to perform a method for providing fine-grained access protection of resources, the method comprising:
- receiving, by an access management service, a request from a requester for a resource in a content management system, wherein the resource comprises a plurality of resource parts;
- determining, by the access management service, a type of the resource;
- invoking, by the access management service, a resource type-specific plugin based on the type of the resource in the request;
- for each resource part of the plurality of resource parts, determining, by the type-specific plugin, whether the requester is authorized to access the resource part based on one or more access policies;
- providing access to the requester to the resource parts the requester is authorized to access; and
- blocking access to the requester to the resource parts the requester is not authorized to access.

16. The non-transitory computer readable storage medium of claim 15, wherein the type-specific plugin includes one of a search module, a content management service-specific plugin, and a custom tag library.

17. The non-transitory computer readable storage medium of claim 15, wherein the one or more access policies comprise access policies that limit access to the requester based on one or more of time of day, location, subscription level, and business hierarchy.

18. The non-transitory computer readable storage medium of claim 16, wherein the type of the resource is a search and the type-specific plugin invoked is the search module, wherein the search module is configured to:
- determine identity information associated with the requester;
- send a search query included with the request for the resource to the content management system;
- receive a query result from the content management system;
- send an access request to an authorization module for each resource in the query result; and
- receive an access decision for each resource in the query result.

19. The non-transitory computer readable storage medium of claim 16, wherein the type of the resource is web page content comprising a plurality of web parts, and wherein the type-specific plugin invoked is the custom tag library, wherein the custom tag library is configured to:
- determine identity information associated with the requester;
- identify, for each web part of the plurality of web parts, an associated tag;
- send an access request, for each web part, including the associated tag and the identity information to an authorization module; and
- receive an access response from the authorization module for each web part.

20. The non-transitory computer readable storage medium of claim 16, wherein the type of the resource is a web page comprising a plurality of web parts, and wherein the type-specific plugin invoked is the content management service-specific plugin, wherein the content management service-specific plugin is configured to:
- determine identity information associated with the requester;
- send an access request, for each web part, including the request for the web part and the identity information to an authorization module; and
- receive an access response from the authorization module for each web part.

* * * * *

UNITED STATES PATENT AND TRADEMARK OFFICE
CERTIFICATE OF CORRECTION

PATENT NO. : 10,104,086 B2
APPLICATION NO. : 14/975208
DATED : October 16, 2018
INVENTOR(S) : Manjunath et al.

It is certified that error appears in the above-identified patent and that said Letters Patent is hereby corrected as shown below:

In the Specification

In Column 6, Line 63, delete "components." and insert -- components). --, therefor.

In Column 12, Line 22, delete "by" and insert -- by the --, therefor.

In Column 19, Line 23, delete "compute" and insert -- computer --, therefor.

Signed and Sealed this
Fourteenth Day of January, 2020

Andrei Iancu
*Director of the United States Patent and Trademark Office*